(12) United States Patent
Torre et al.

(10) Patent No.: US 7,937,586 B2
(45) Date of Patent: May 3, 2011

(54) DEFENDING AGAINST DENIAL OF SERVICE ATTACKS

(75) Inventors: Douglas Robert de la Torre, Mercer Island, WA (US); Aidan Thomas Joseph Hughes, Bellevue, WA (US); Josh Benaloh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 952 days.

(21) Appl. No.: 11/771,034

(22) Filed: Jun. 29, 2007

(65) Prior Publication Data

US 2009/0007265 A1    Jan. 1, 2009

(51) Int. Cl.
*H04L 9/00* (2006.01)
*G06F 11/00* (2006.01)

(52) U.S. Cl. .................... 713/168; 726/22; 726/2; 726/3
(58) Field of Classification Search .................. 726/2, 3, 726/4, 22, 23; 713/168, 150
See application file for complete search history.

(56) References Cited

U.S. PATENT DOCUMENTS

| | | | | |
|---|---|---|---|---|
| 5,636,280 A * | 6/1997 | Kelly | | 713/155 |
| 5,784,460 A * | 7/1998 | Blumenthal et al. | | 705/51 |
| 6,772,334 B1 | 8/2004 | Glawitsch | | |
| 6,791,949 B1 * | 9/2004 | Ryu et al. | | 370/254 |
| 6,944,663 B2 * | 9/2005 | Schuba et al. | | 709/225 |
| 7,024,548 B1 * | 4/2006 | O'Toole, Jr. | | 713/1 |
| 7,024,695 B1 * | 4/2006 | Kumar et al. | | 726/26 |
| 7,107,619 B2 * | 9/2006 | Silverman | | 726/27 |
| 7,321,971 B2 * | 1/2008 | Wilding et al. | | 713/169 |
| 7,334,255 B2 * | 2/2008 | Lin et al. | | 726/2 |
| 7,657,639 B2 * | 2/2010 | Hinton | | 709/229 |
| 7,694,335 B1 * | 4/2010 | Turner et al. | | 726/14 |
| 2002/0001386 A1 * | 1/2002 | Akiyama | | 380/201 |
| 2002/0007347 A1 * | 1/2002 | Blumenthal et al. | | 705/51 |
| 2002/0178238 A1 * | 11/2002 | Fletcher et al. | | 709/220 |
| 2003/0007635 A1 * | 1/2003 | Li et al. | | 380/28 |
| 2003/0065956 A1 * | 4/2003 | Belapurkar et al. | | 713/202 |
| 2004/0143670 A1 * | 7/2004 | Roychowdhury et al. | | 709/229 |
| 2005/0125663 A1 * | 6/2005 | Funk | | 713/168 |
| 2005/0129243 A1 * | 6/2005 | Bousis | | 380/277 |
| 2005/0271049 A1 * | 12/2005 | Jain et al. | | 370/389 |

(Continued)

OTHER PUBLICATIONS

Adam back, "Hashcash—A Denial of Service Counter-Measure", Aug. 1, 2002, pp. 1-10.

(Continued)

*Primary Examiner* — Edward Zee
(74) *Attorney, Agent, or Firm* — Capitol City TechLaw; Richard C. Irving

(57) ABSTRACT

In various embodiments, a server may be provided. The server may respond to a request for a service, from a processing device, with a challenge. The challenge may include a partial key for a memory-intensive operation, a number of iterations of the memory-intensive operation to perform, and a result of performing the number of iterations of the memory-intensive operation. Upon receiving the challenge, the processing device may choose a complete key consistent with the partial key and may produce a proposed result by performing the memory-intensive operation for the number of iterations. When the proposed result matches the result included in the challenge, the processing device may send a challenge answer, including the chosen complete key, to the server. Upon receiving a correct challenge answer from the processing device, the server may access the requested service and may return a result of the access to the processing device.

14 Claims, 6 Drawing Sheets

U.S. PATENT DOCUMENTS

2006/0004770 A1* 1/2006 Nakano et al. .................. 707/10
2006/0053487 A1* 3/2006 Jeffries et al. ................... 726/22
2006/0161980 A1* 7/2006 Huitema et al. ................ 726/22
2006/0272023 A1* 11/2006 Schmeidler et al. ............ 726/26
2007/0033650 A1* 2/2007 Grosse et al. ................... 726/22
2007/0211902 A1* 9/2007 Newman et al. .............. 380/278
2007/0234033 A1* 10/2007 Bade ............................. 713/150

OTHER PUBLICATIONS

Srivatsa et al., "A Client-Transparent Approach to Defend Against Denial of Service Attacks", IEEE Computer Society, Oct. 2006, pp. 10.

Dwork et al., "On Memory-Bound Function for Fighting Spam ", Springer-Verlag, Aug. 2003, pp. 17.

* cited by examiner

DEFENDING AGAINST DENIAL OF SERVICE ATTACKS

BACKGROUND

Software vendors may deploy services on servers connected to a network, such as, for example, the Internet, or other networks. When the services are provided on the Internet, the services may be called web services. Third parties may use the deployed services by accessing the servers. If a server, which provides a particular service, is not operational, then the particular service is not available and a software vendor who provides the particular service may appear to be unreliable.

Services, such as, for example, publicly-provided web services, may be attacked by hackers. One type of attack that hackers may employ includes the use of botnets (multiple processing devices working in tandem, typically, with a malicious purpose) to overload and effectively, disable a server. Such an attack is called a Denial of Service (DoS) attack.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a server may send a challenge to a processing device in response to receiving a request, from the processing device, for access to a service. The challenge may include a partial key for a memory-intensive operation to be performed by the processing device, as well as a number of iterations of the memory-intensive operation to perform, and a result of performing the number of iterations of the memory-intensive operation. Upon receiving the challenge, the processing device may search for a complete key consistent with the partial key and may perform the memory-intensive operation for the number of iterations to produce a proposed result. If the proposed result matches the result included in the challenge, the processing device may send a challenge answer, including the complete key, to the server. If the server determines that the complete key included in the challenge answer is correct, then the server may access the requested service and may return a result of the access to the processing device.

In some embodiments, consistent with the subject matter of this disclosure, the server may calculate a blinding value, corresponding to a number of hidden bits of the partial key. The blinding value may be based, at least in part, on a level of busyness of the server. Further, in some embodiments, the server may include, with the challenge, a timestamp and a digital signature, signed with the server's private key. If the response to the challenge is not received by the server within a predetermined time window, or the response does not include a valid digital signature then the server may discard the response. Additionally, in some embodiments, the server may maintain a cache of recently received challenge answers and may discard a newly received answer if it is already in the cache.

In various embodiments, the memory-intensive operation may include a stream cipher operation. Other embodiments may include other memory-intensive operations.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
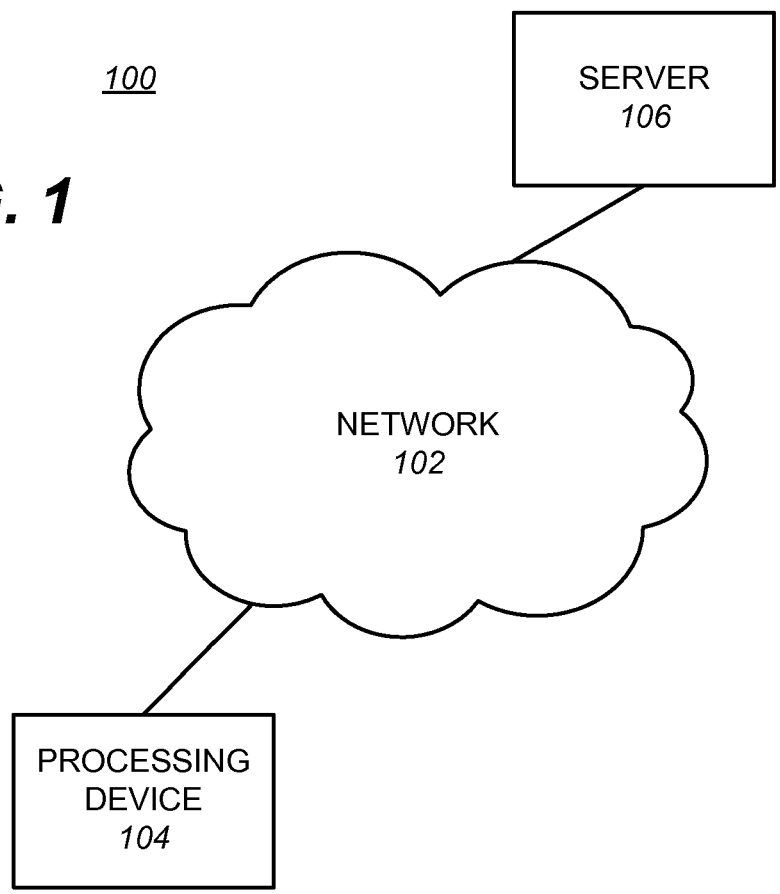
FIG. 1 illustrates an exemplary operating environment for embodiments consistent with the subject matter of this disclosure.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

In embodiments consistent with the subject matter of this disclosure, a network-connected processing device, such as, for example, a client device, may send a request to access a service provided via the network. A processing device, such as, for example, a server, which provides the service, may receive the request and may respond by creating and transmitting a challenge to the client device. In some embodiments, the challenge may include a partial key for a memory-intensive operation, a number of iterations to perform, and a result of performing the memory-intensive operation for the number of iterations using a complete key corresponding to the partial key. In some embodiments, a number of bits of the partial key not provided may be determined based on a level of busyness of the server. The level of busyness may be determined based on processor utilization of the server and/or a length of a queue, such as, for example, a queue of requests for accessing the service. In other embodiments, the level of busyness may be determined based on one or more other factors.

The client device may receive the challenge and may select a proposed complete key corresponding to the partial key. The client device may then perform the memory-intensive operation for the number of iterations using the proposed complete key to produce a proposed result. If the proposed result equals the result included with the challenge, the client device may transmit a challenge answer, including the proposed complete key, to the server. Otherwise, the client device may select a next proposed complete key corresponding to the partial key and may repeat performing of the memory-intensive operation for the number of iterations using the next proposed complete key to produce a next proposed result. The client device may repeat the process until use of a proposed complete key produces a proposed result that matches the result included with the challenge.

The server may receive the challenge answer and may determine whether the challenge answer is correct. A correct challenge answer may include a proposed complete key that matches a complete key used by the server to create the challenge. If the challenge answer is determined to be correct, the server may access the requested service and may return a result of accessing the requested service to the client device.

In some embodiments consistent with the subject matter of this disclosure, the challenge may be transmitted by the server with a timestamp and a digital signature, which may be calculated over the challenge and the timestamp. The challenge answer provided by the client device may include the challenge, a copy of the timestamp included with the challenge, and the digital signature. If the challenge answer received by the server includes a correct challenge answer, a valid digital signature, and a copy of the timestamp indicating a time within a predetermined time window of a current time, then the server may access a requested service and may provide a result of accessing the requested service to the client device.

Exemplary Operating Environment

FIG. 1 illustrates an exemplary operating environment 100 for embodiments consistent with the subject matter of this disclosure. Operating environment 100 may include a network 102, a processing device 104, and one or more servers 106.

Network 102 may be a single network or a combination of networks, such as, for example, the Internet. Network 102 may include a wireless network, a wired network, a packet-switching network, a public switched telecommunications network, a fiber-optic network, other types of networks, or any combination of the above.

Processing device 104 may be a user's processing device, such as, for example, a desktop personal computer (PC), a laptop PC, a handheld processing device, or other processing device. In embodiments consistent with the subject matter of this disclosure, processing device 104 may function as a client, which may request a service provided by a server via network 102. In embodiments in which the service is provided via the Internet, the service may be called a web service.

Server 106 may be a processing device or a group of processing devices configured to work together to provide a service via network 102. In embodiments in which server 106 include a group of processing devices, the processing devices may be configured as a server farm.

Exemplary Processing Device

Figure 2:
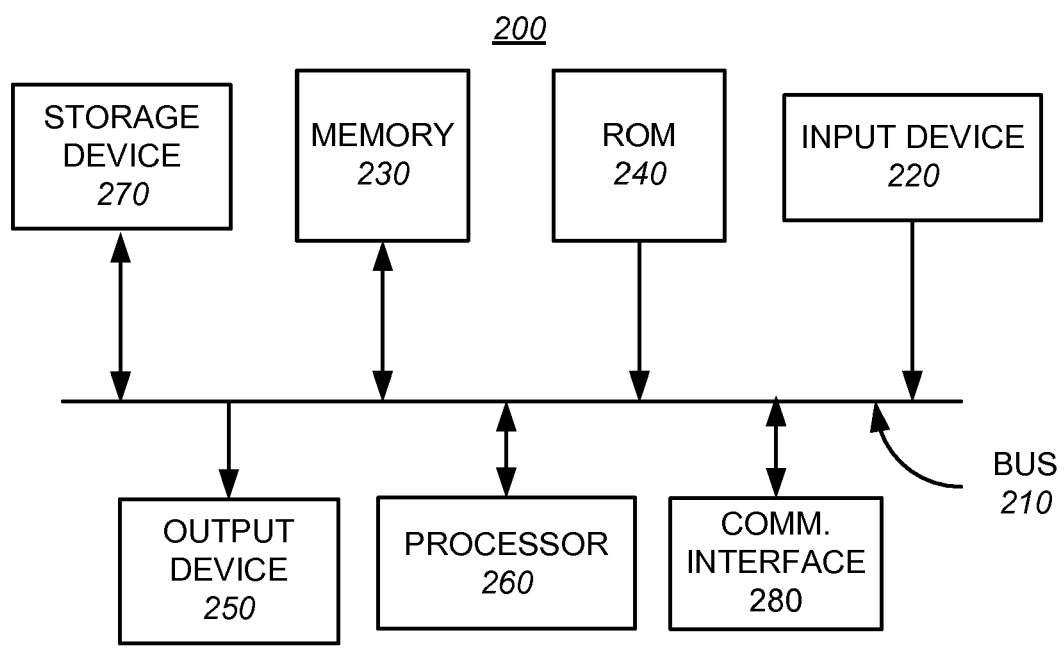
FIG. 2 is a functional block diagram of a processing device, which may be used to implement a server or a processing device shown in FIG. 1.

FIG. 2 is a functional block diagram that illustrates an exemplary processing device 200, which may be used to implement embodiments of processing device 104 and/or server 106 consistent with the subject matter of this disclosure.

Processing device 200 may include a bus 210, an input device 220, a memory 230, a read only memory (ROM) 240, an output device 250, a processor 260, a storage device 270, and a communication interface 280. Bus 210 may permit communication among components of processing device 200.

Processor 260 may include at least one conventional processor or microprocessor that interprets and executes instructions. Memory 230 may be a random access memory (RAM) or another type of dynamic storage device that stores information and instructions for execution by processor 260. Memory 230 may also store temporary variables or other intermediate information used during execution of instructions by processor 260. ROM 240 may include a conventional ROM device or another type of static storage device that stores static information and instructions for processor 260. Storage device 270 may include any type of media for storing data and/or instructions.

Input device 220 may include a keyboard or other input device. Output device 250 may include one or more conventional mechanisms that output information to the user, including one or more display screens, or other output devices.

Communication interface 280 may include a transceiver for transmitting and receiving information to or from network 102. Communication interface 280 may transmit and receive information via a wireless or wired connection.

Processing device 200 may perform such functions in response to processor 260 executing sequences of instructions contained in a tangible machine-readable medium, such as, for example, memory 230, ROM 240, or other medium. Such instructions may be read into memory 230 from another machine-readable medium, such as storage device 270, or from a separate device via communication interface 280.

Exemplary Server Processes

Figure 3:
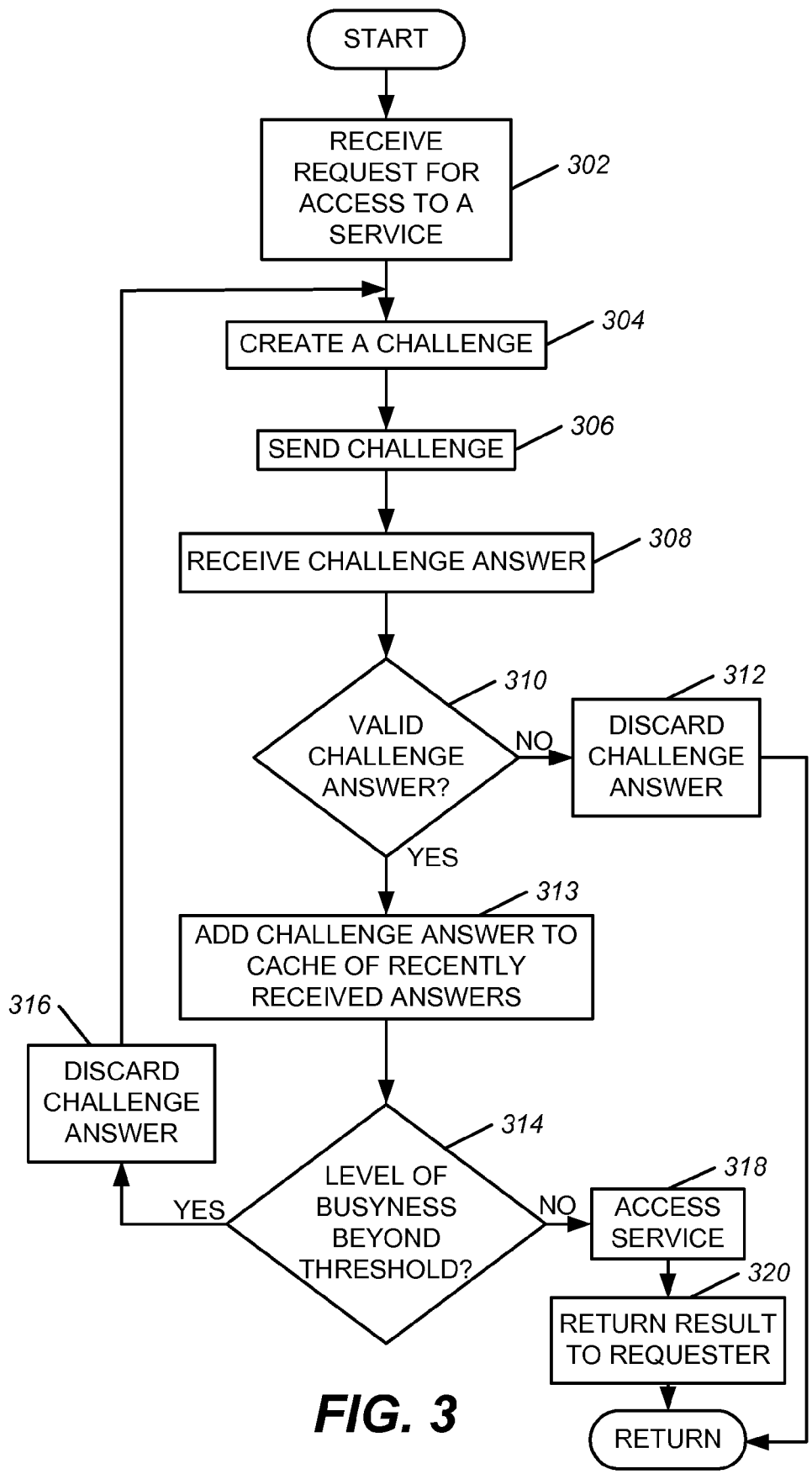
FIGS. 3-6 are flowcharts illustrating exemplary processes that may be performed by an embodiment of a server consistent with the subject matter of this disclosure.

FIG. 3 is a flowchart illustrating an exemplary process, which may be performed in embodiments of server 106 consistent with the subject matter of this disclosure. The process may begin with server 106 receiving a request for access to a service, such as, for example, a web service, or other service, from processing device 104, which may function as a client device (act 302). Next, server 106 may create a challenge in response to receiving the request for access to the service (act 304).

Figure 4:
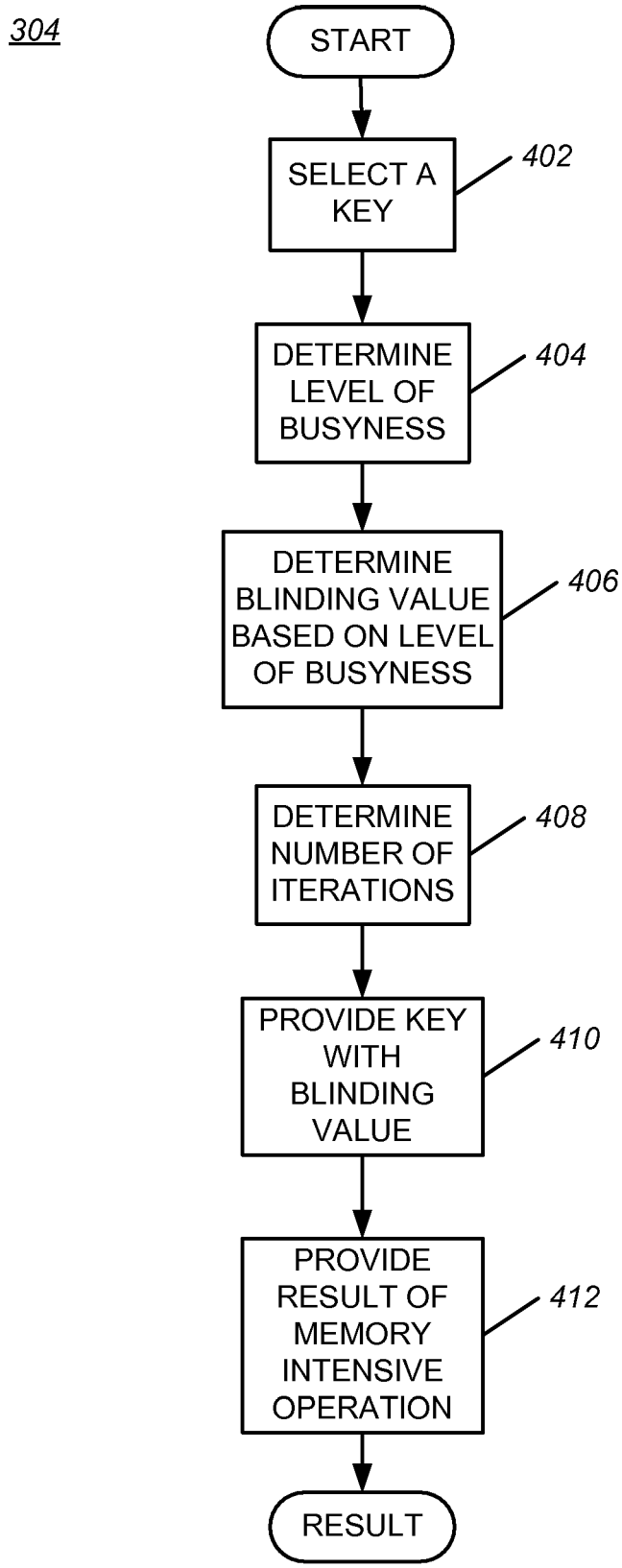

FIG. 4 is a flowchart illustrating an exemplary process for performing act 304 in embodiments consistent with the subject matter of this disclosure. The process may begin with server 106 selecting a key (act 402). In some embodiments, the key may be a variable length key having a length between 40 and 256 bits, inclusively. In other embodiments, a different key length may be employed.

Next, server 106 may determine a level of busyness (act 404). The level of busyness may be determined based on one or more factors. In some embodiments, server 106 may determine the level of busyness based on processor utilization and/or a length of a queue, such as, for example, a queue of requests for access to a service, or another queue. In other embodiments, the level of busyness may be based on one or more other factors. Server 106 may then determine a blinding value based on the determined level of busyness (act 406). The blinding value corresponds to a number of bits of the key to be blinded, or hidden, from the client device. In some embodiments, the blinding value may be high when a determined level of busyness is high and may be low when a determined level of busyness is low.

Server 106 may then determine a number of iterations to perform of a memory-intensive process (act 408). In some embodiments, the number of iterations may be based on the level of busyness. For example, the number of iterations may be high when the level of busyness is high and may be low when the level of busyness is low.

Server 106 may then create a challenge by providing the key with a number of hidden bits (partial key), corresponding to the blinding value (act 410) and by providing a result of performing the memory-intensive operation for the number of iterations (act 412).

In some embodiments consistent with the subject matter of this disclosure, the memory-intensive operation may include a stream cipher operation, or another memory-intensive operation. The stream cipher operation may include, for example, RC4® (RC4 is a registered trademark of RSA Security, Inc. of Bedford, Mass.), ARC4 or another stream cipher operation. In one embodiment, values may be written to a block of memory and a stream cipher operation may be performed over the block of memory to generate a challenge answer.

Returning to FIG. 3, server 106 may send the challenge to processing device 104 (act 306).

Figure 5:
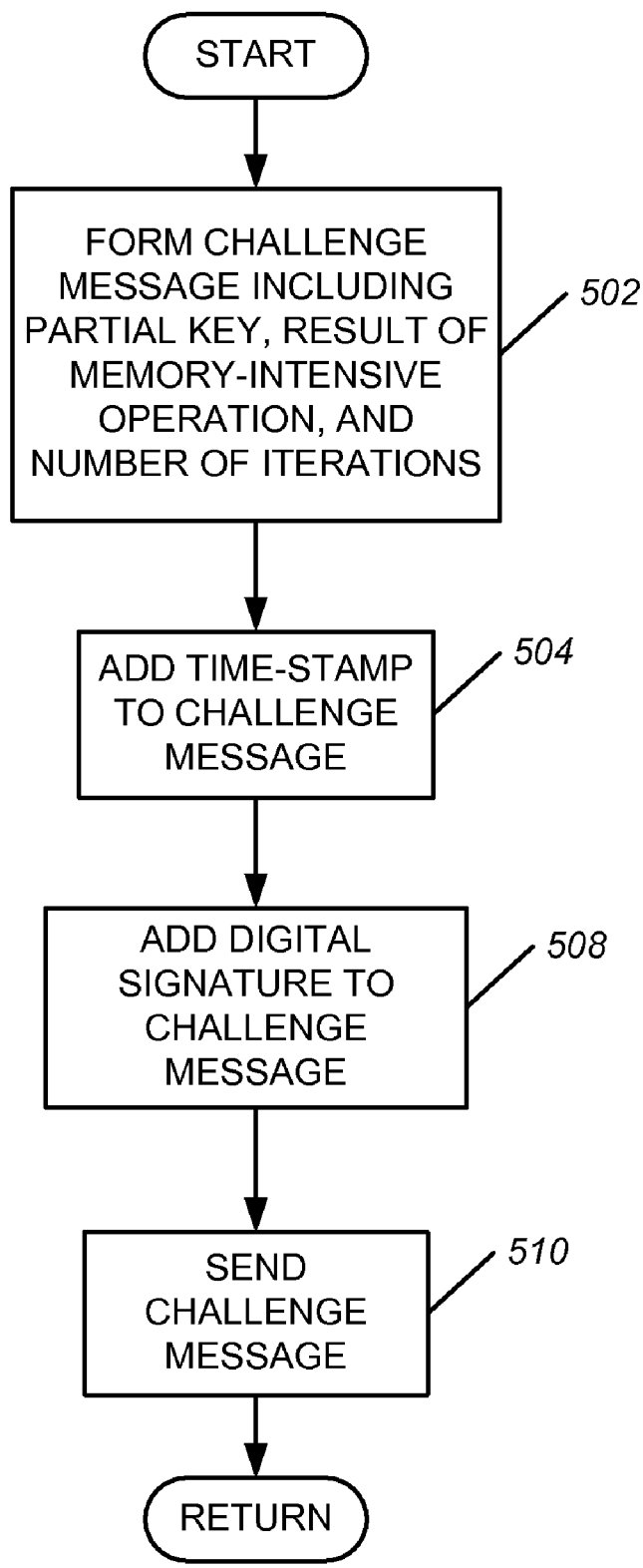

FIG. 5 is a flowchart illustrating an exemplary process for performing act 306. The process may begin with server 106 forming a challenge message including the key having a number of hidden bits (partial key), the result of performing the memory-intensive operation for the number of iterations, and a value corresponding to the number of iterations (act 502). The number of hidden bits may correspond to the blinding value.

Server 106 may then add a timestamp to the challenge message (act 504), and may calculate and add a digital signature to the challenge message (act 508). The digital signature may be calculated, using a secret key of server 106 (or a secret key of a respective one of server 106 when server 106 includes a server farm), over challenge message information, including the partial key, the result of performing the memory-intensive operation for the number of iterations, the value corresponding to the number of iterations, and the timestamp. In one embodiment, the digital signature may be a hashed message authentication code (HMAC). Other types of digital signatures may be used in other embodiments. Server 106 may then send the challenge message to the client device (act 510).

Returning to FIG. 3, server 106 may receive a challenge answer from processing device 104 (act 308). Server 106 may then determine whether the received challenge answer is valid (act 310).

Figure 6:
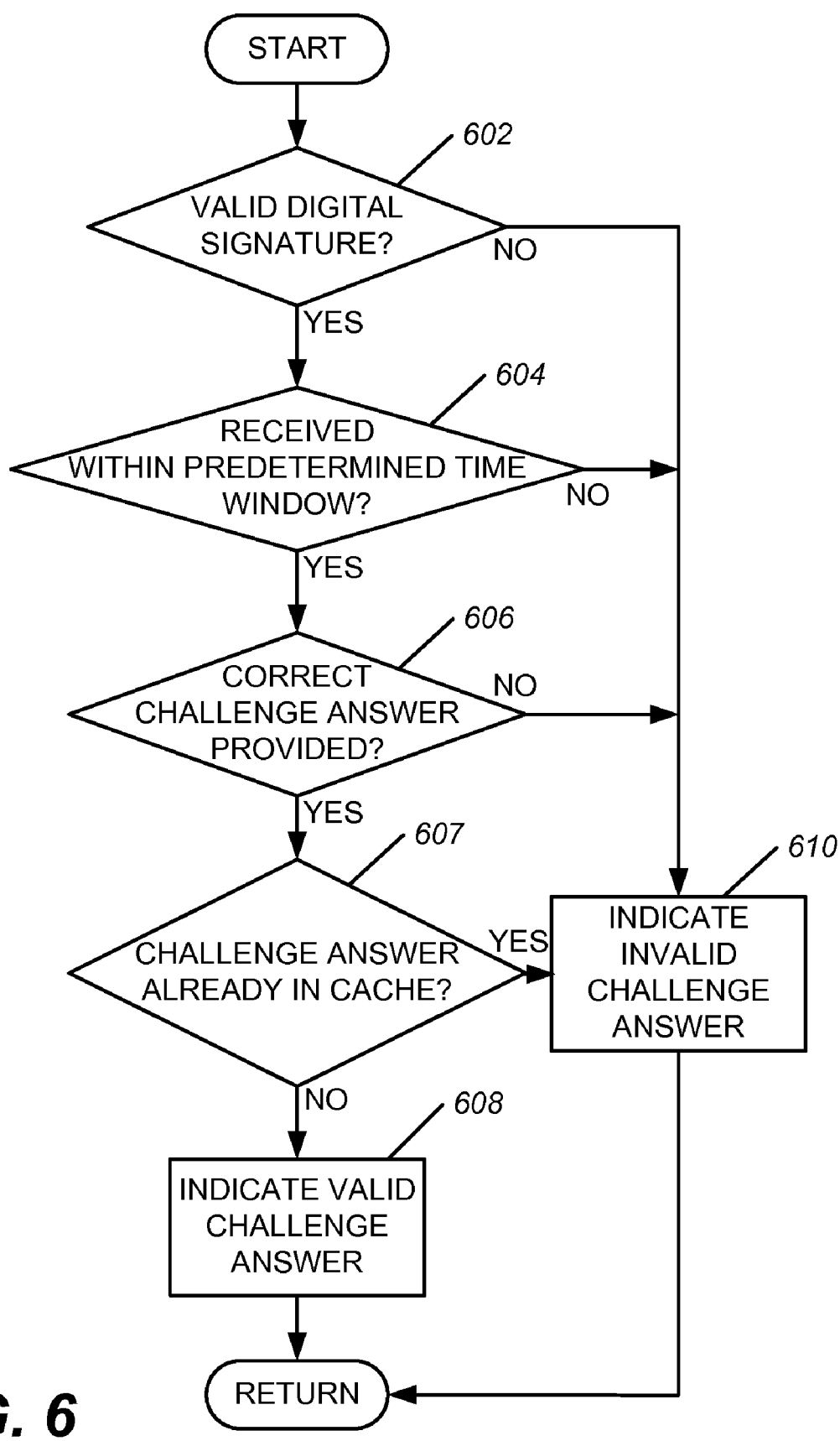

FIG. 6 is a flowchart illustrating an exemplary process for performing act 310. The process may begin with server 106 determining whether the received challenge answer includes a valid digital signature (act 602). In some embodiments, the received challenge answer may include a copy of the challenge, including the partial key, the number of iterations, and a result of performing the memory-intensive operation for the number of iterations, as well as a timestamp and a digital signature calculated over the copy of the challenge and the timestamp. As mentioned previously, the digital signature may be calculated according to a hashed message authentication code (HMAC). In other embodiments, the digital signature may be calculated according to another method.

If server 106 determines that the received challenge answer includes a valid digital signature signed by server 106 (or by one of server 106 when server 106 includes a server farm), then server 106 may compare the received timestamp with a current time to determine whether the challenge answer was received within a predetermined time window (act 604). In some embodiments, the predetermined time window may be a time period of 15 minutes measured from a time indicated by the received timestamp. In other embodiments, a different predetermined time window may be employed.

If server 106 determines that the received challenge answer is received within the predetermined time window, then server 106 may determine whether the received challenge answer includes a correct challenge answer (act 606). In some embodiments, a correct challenge answer includes a complete copy of the key selected by server 106 during act 402. Additionally, in some embodiments, if server 106 determines that the received challenge answer is correct, then server 106 may check if the challenge answer is already in a cache of recently received answers (act 607). If server 106 determines that the correct challenge answer is not included in the cache of recently received answers, then an indication of a valid challenge answer may be provided (act 608).

If, during act 602, server 106 determines that the received digital signature is invalid, or during act 604, server 106 determines that the received challenge answer was not received within the predetermined time window, or during act 606, server 106 determines that the challenge answer is not correct, or during act 607, server 106 determines that this is a repetition of a previously received challenge answer, then server 106 may provide an indication that the challenge answer is invalid (act 610).

Returning to FIG. 3, if server 106 determines that the challenge answer is invalid (an invalid challenge answer was indicated during act 610), then server 106 may discard the challenge answer (act 312).

If server 106 determines that the challenge answer is valid (a valid challenge answer was indicated during act 608), then server 106 may add this challenge answer to a cache of recently received answers (act 313). Server 106 may also determine whether a level of busyness is beyond a threshold (act 314). For example, server 106 may determine that the level of busyness is beyond the threshold when a processor utilization of server 106 is beyond a given amount, such as, for example, 85%, or another suitable value, or when a length of a queue, such as, for example, a queue of received service requests, is beyond a queue length threshold, such as, for example, 100, or another suitable value.

If server 106 determines that the level of busyness of server 106 is beyond the threshold, then server 106 may discard the received challenge answer (act 316) and server 106 may repeat acts 304-314 to create and send a new challenge. Otherwise, server 106 may access the requested service (act 318) and may return a result of accessing the requested service to the requesting processing device 104 (act 320).

Exemplary Client Process

Figure 7:
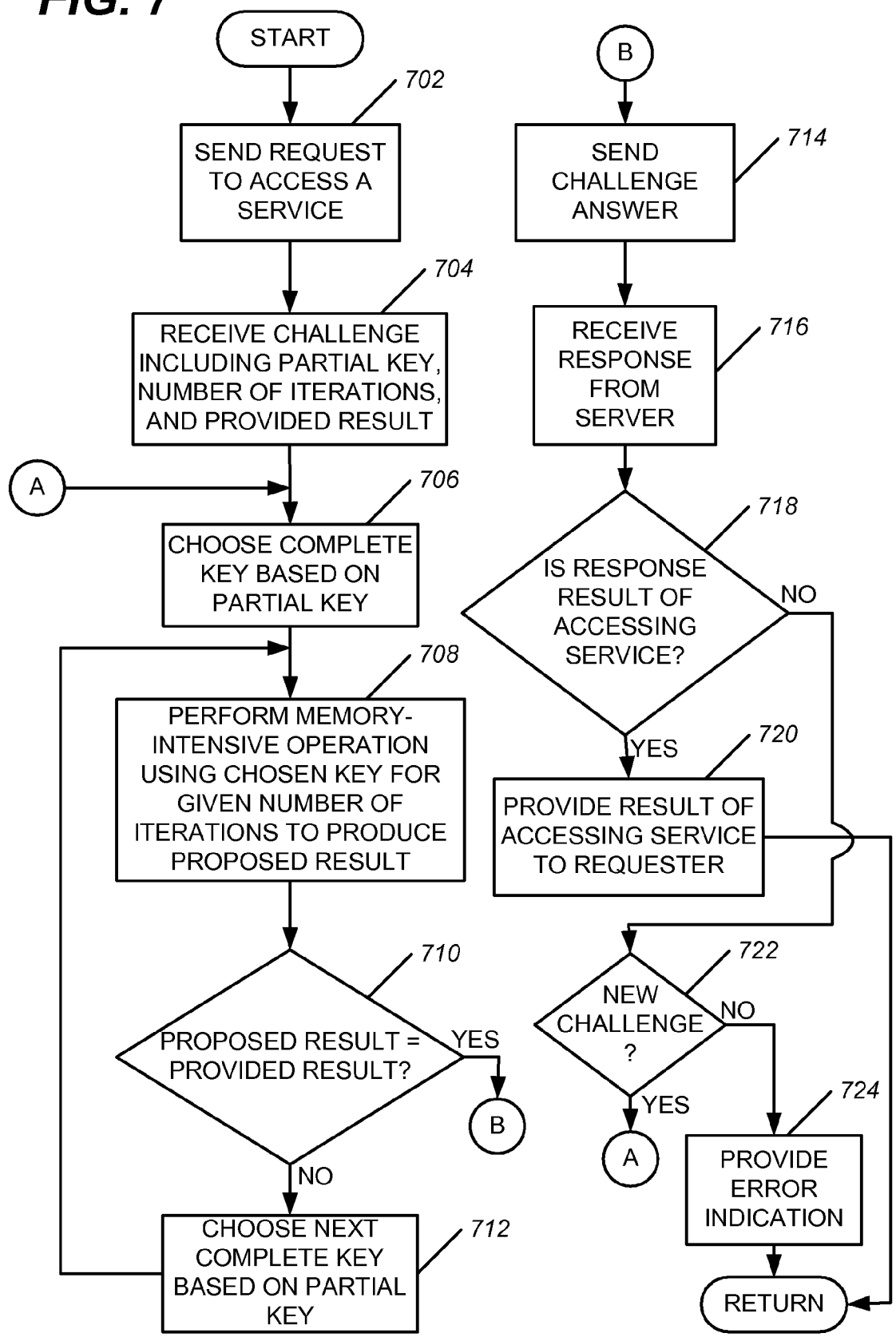
FIG. 7 is a flowchart illustrating an exemplary process that may be performed by an embodiment of a processing device acting as a client.

FIG. 7 is a flowchart illustrating an exemplary process, which may be performed by processing device 104 acting as a client device. The process may begin with processing device 104 sending to server 106 a request to access a service (act 702). As a result of sending the request to access a service, processing device 104 may receive from server 106 a challenge, which may include a partial key for a memory-intensive operation, such as, for example, a stream cipher operation or another operation, a value for a number of iterations, and a provided result of performing the memory-intensive operation using a complete key, corresponding to the partial key, for the number of iterations (act 704).

Processing device 104 may then choose a complete key based on the received partial key (act 706). In some embodiments, the key may have a key length of between 5 and 16 bytes, corresponding to 40-128 bits. In other embodiments, the key may have a different length.

Processing device 104 may perform the memory-intensive operation using the chosen complete key for the number of iterations to produce a proposed result (act 708). In some embodiments, processing device 104 may perform a stream cipher operation using the chosen key. Processing device 104 may then determine whether the proposed result of the memory-intensive operation matches the provided result included in the received challenge (act 710). If the proposed result does not match the provided result, then processing device 104 may choose a next complete key based on the partial key (act 712). As an example, suppose the partial key is 1XX7AF in a hexadecimal representation, where "X" represents hidden bits. Corresponding complete keys may include, for example, 1007AF, 1017AF, 1027AF, 1037 AF, ..., 1FD7AF, 1FE7AF, and 1FF7AF. Processing device 104 may then repeat acts 708-712.

If, during act 710, processing device 104 determines that the proposed result equals the result provided in the challenge, then processing device 104 may send a challenge answer, including the proposed result, to server 106 (act 714). In various embodiments, the challenge answer may further include a copy of information from the challenge, such as, for example, the partial key, the number of iterations, the result of performing the memory-intensive operation for the number of iterations, the timestamp, and the digital signature.

As a result of sending the challenge answer to server 106, processing device 104 may receive a response from server 106 (act 716). Processing device 104 may determine whether the response includes a result of accessing the requested service (act 718). If the response includes the result of accessing the requested service, then processing device 104 may provide the result of accessing the requested service to a requester, such as, for example, a requesting application (act 720).

If, during act 718, processing device 104 determines that the response does not include the result of accessing the requested service, then processing device 104 may determine whether the response includes a new challenge (act 722). If the response includes a new challenge, then processing device 104 may repeat acts 706-722. If the response does not include a new challenge, then processing device 104 may provide an error indication (act 724).

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

We claim as our invention:

1. A machine-implemented method for defending against a denial of service attack, the machine-implemented method comprising:
   receiving a request from a client for access to a web service;
   determining a level of busyness based on processor utilization after the receiving of the request from the client;
   determining a number of bits of a complete key to hide when forming a partial key based on the determined level of busyness;
   responding to the client with a challenge including the partial key for a memory intensive operation to be performed by the client;
   receiving a response to the challenge from the client;
   determining whether the response to the challenge includes a correct challenge answer; and
   returning to the client a result of accessing the web service when the response to the challenge is determined to include the correct challenge answer, wherein
   the machine-implemented method is implemented by a processing device.

2. The machine-implemented method of claim 1, wherein the returning to the client a result of accessing the web service is performed only when the response to the challenge is determined to include the correct challenge answer.

3. The machine-implemented method of claim 1, wherein the memory intensive operation comprises:
   writing values to a block of memory; and
   using a stream cipher operation over the block of memory to generate a challenge answer for the response to the challenge.

4. The machine-implemented method of claim 1, wherein a number of bits of the partial key to be revealed to the client is smaller when the determined level of busyness is high and the number of bits of the partial key to be revealed to the client is larger when the determined level of busyness is low.

5. The machine-implemented method of claim 1, wherein:
   the responding to the client with a challenge further comprises including with the challenge a digital signature calculated over the challenge, and
   the machine-implemented method further comprises:
      determining whether the response to the challenge includes a valid digital signature,
      discarding the response to the challenge when the response to the challenge lacks the valid digital signature,
      determining whether a challenge answer included in the response to the challenge is already in a cache of recently received challenge answers, and
      discarding the response to the challenge when the challenge answer included in the response to the challenge is already in the cache of recently received challenge answers.

6. The machine-implemented method of claim 1, wherein:
   the responding to the client with a challenge further comprises including a timestamp with the challenge, and
   the timestamp is included in the response to the challenge, the machine-implemented method further comprises:
      determining, based on the timestamp included in the response to the challenge, whether the response to the challenge is received within a predetermined time window, and
      discarding the response to the challenge when the challenge is received outside of the predetermined time window.

7. The machine-implemented method of claim 1, wherein:
   the responding to the client with a challenge further comprises:
      including a timestamp and a digital signature with the challenge, the digital signature being calculated over the challenge and the timestamp, wherein
      the timestamp is included in the response to the challenge, and the machine-implemented method further comprises:
         determining whether the response to the challenge includes a valid digital signature,
         when the challenge is determined to include the valid digital signature, determining, based on the timestamp included in the response to the challenge, whether the response to the challenge is received within a predetermined time window, and returning to the client the result of accessing the web service only when the response to the challenge is determined to include the correct challenge answer and the response to the challenge is received within the predetermined time window.

8. At least one server arranged to provide a service, each of the at least one server comprising:

at least one processor; and a memory connected to the at least one processor, the memory further comprising:

instructions for determining a level of busyness based on a utilization of the at least one processor, instructions for determining a number of bits of a complete key to hide when forming a partial key based on the determined level of busyness, instructions for creating and sending a challenge to a client in response to receiving a request from the client for access to the service, the challenge including the partial key for a stream cipher operation, a specified number of iterations with respect to the stream cipher operation, and a result of performing the stream cipher operation using the complete key for the specified number of iterations of the stream cipher operation, instructions for determining whether a challenge answer from the client, responsive to sending the challenge, includes the complete key, and instructions for permitting the access to the service and returning a result of the access to the client when the challenge answer from the client includes the complete key.

9. The at least one server of claim 8, wherein the memory further comprises:

instructions for creating and sending a second challenge to the client in response to receiving the client answer when the determined level of busyness is greater than a predetermined level.

10. The at least one server of claim 8, wherein the memory further comprises:

instructions for determining whether a challenge answer from the client is received within a predetermined time window measured from a time the challenge is created, wherein the instructions for permitting the access to the service and returning a result of the access to the client when the challenge answer from the client includes the complete key further only permits the access to the service when the challenge answer is received within the predetermined time window.

11. The at least one server of claim 8, wherein the instructions for creating and sending a challenge to the client in response to receiving a request from the client for access to the service further comprise:

instructions for calculating a valid digital signature over the challenge and including the valid digital signature with the challenge, instructions for discarding a received challenge answer from the client when the received challenge answer fails to include the valid digital signature, p1 instructions for determining whether the received challenge answer is already in a cache of recently received challenge answers, and p1 instructions for discarding the received challenge answer when the received challenge answer is already in the cache of recently received challenge answers.

12. The at least one server of claim 8, wherein the instructions for creating and sending a challenge to the client in response to receiving a request from the client for access to the service further comprise:

instructions for including a timestamp with the challenge, instructions for calculating a valid digital signature over the challenge and the timestamp and including the valid digital signature with the challenge, and instructions for discarding a received challenge answer from the client when the received challenge answer fails to include the valid digital signature or when the challenge answer is received outside of a predetermined time window measured from a time as indicated in a copy of the timestamp included with the challenge answer.

13. The at least one server of claim 8, wherein a number of bits of the partial key to be revealed to the client is smaller when the determined level of busyness is high and the number of bits of the partial key to be revealed to the client is larger when the determined level of busyness is low.

14. The at least one server of claim 8, wherein the instructions for determining a level of busyness based on a utilization of the at least one processor further comprise:

instructions for determining the level of busyness further based on a number of items in at least one queue.

* * * * *

UNITED STATES PATENT AND TRADEMARK OFFICE
CERTIFICATE OF CORRECTION

| | | |
|---|---|---|
| PATENT NO. | : 7,937,586 B2 | Page 1 of 1 |
| APPLICATION NO. | : 11/771034 | |
| DATED | : May 3, 2011 | |
| INVENTOR(S) | : Douglas Robert de la Torre et al. | |

It is certified that error appears in the above-identified patent and that said Letters Patent is hereby corrected as shown below:

In column 10, line 14, in Claim 11, after "signature," delete "p1".

In column 10, line 17, in Claim 11, after "and" delete "p1".

Signed and Sealed this

Nineteenth Day of July, 2011

David J. Kappos
*Director of the United States Patent and Trademark Office*